(12) United States Patent
Yoshioka

(10) Patent No.: US 7,357,236 B2
(45) Date of Patent: *Apr. 15, 2008

(54) PRESSURE RELIEF VALVE ACTUATOR FOR HYDRAULIC TORQUE COUPLING ACTUATOR

(75) Inventor: Jun Yoshioka, Canton, MI (US)

(73) Assignee: Dana Automotive Systems Group, LLC, Toledo, OH (US)

( * ) Notice: Subject to any disclaimer, the term of this patent is extended or adjusted under 35 U.S.C. 154(b) by 192 days.

This patent is subject to a terminal disclaimer.

(21) Appl. No.: 11/206,191

(22) Filed: Aug. 18, 2005

(65) Prior Publication Data

US 2007/0039797 A1 Feb. 22, 2007

(51) Int. Cl.
*F16H 48/22* (2006.01)
*F16D 43/284* (2006.01)

(52) U.S. Cl. .............................. 192/103 F; 251/129.16; 475/88; 475/231

(58) Field of Classification Search .................. 475/88
See application file for complete search history.

(56) References Cited

U.S. PATENT DOCUMENTS

| | | | |
|---|---|---|---|
| 2,588,137 A | 3/1952 | Marvin | |
| 3,982,562 A | 9/1976 | Pickett | |
| 4,170,339 A | 10/1979 | Ueda et al. | |
| 4,506,861 A | 3/1985 | Showalter | |
| 4,759,528 A | 7/1988 | Morris | |
| 4,771,983 A | 9/1988 | Sakaguchi et al. | |
| 6,068,010 A | 5/2000 | Reinicke | |
| 6,183,387 B1 * | 2/2001 | Yoshioka | 475/88 |
| 6,517,045 B1 | 2/2003 | Northedge | |
| 6,581,741 B2 * | 6/2003 | Taureg | 192/35 |
| 6,692,396 B1 | 2/2004 | Grogg et al. | |
| 6,820,651 B2 | 11/2004 | Seuret et al. | |
| 7,241,247 B1 * | 7/2007 | Hunt et al. | 475/231 |

* cited by examiner

*Primary Examiner*—Rodney H. Bonck
(74) *Attorney, Agent, or Firm*—Berenato, White & Stavish

(57) ABSTRACT

A hydraulically actuated torque coupling assembly that has an actuator plate mechanism integrated within the pressure relief valve assembly. The actuator plate includes a valve closure member and two alignment pins. The valve closure member is disposed adjacent to a valve seat on the face of the torque coupling assembly. The actuator plate and an associated electro-magnetic solenoid assembly are partially enclosed in a stationary housing that is positioned outside the coupling case. A variable amount of electrical current is applied to the solenoid assembly so that the actuator plate valve closure member engages the associated valve seat. The release pressure of the pressure relief valve assembly is selectively based on the magnitude of an electric current supplied to the solenoid assembly.

20 Claims, 4 Drawing Sheets

PRESSURE RELIEF VALVE ACTUATOR FOR HYDRAULIC TORQUE COUPLING ACTUATOR

BACKGROUND OF THE INVENTION

1. Field of the Invention

The present invention relates to torque coupling assemblies for motor vehicles, and more particularly to a torque coupling assembly having an electronically controlled hydraulic actuator including an electro-magnetically actuated variable pressure relief valve.

2. Description of the Prior Art

Hydraulic couplings are used in various vehicular drivetrain applications to limit slip and transfer drive torque between a pair of rotary members. In all-wheel drive applications, hydraulic couplings are used to automatically control the drive torque transferred from a driven member to a non-driven member in response to speed differentiation therebetween. In limited slip applications, couplings are used in association with a differential to automatically limit slip and bias the torque distribution between a pair of rotary members.

Such hydraulic couplings conventionally use a frictional clutch between the rotary members. The frictional clutch may be selectively actuated by various hydraulic actuator assemblies, which are constructed of elements disposed inside the differential casing. The hydraulic actuator assemblies internal to a torque-coupling case often include displacement pumps disposed inside the torque-coupling case and actuated in response to a relative rotation between the torque-coupling case and the output shaft. The displacement pumps are usually in the form of internal gear pumps, such as gerotor pumps adapted to convert rotational work to hydraulic work. In the internal gear pumps, an inner gear having outwardly directed teeth cooperates with an external gear having inwardly directed teeth so that fluid chambers therebetween increase and decrease in volume as the inner and outer gears rotate in a housing.

While known hydraulic couplings, including but not limited to those discussed above, have proven to be acceptable for various vehicular driveline applications, such devices are nevertheless susceptible to improvements that may enhance their performance and cost. With this in mind, a need exists to develop improved hydraulic torque-coupling assemblies that advance the art. More specifically, the need exists for a pressure relief valve assembly that simplifies torque coupling design and provides a reliable means of actuating the pressure relief valve.

SUMMARY OF THE INVENTION

The current invention comprises a hydraulic torque coupling assembly that includes a hollow casing rotatably supported within a coupling housing. The hollow casing has at least one output shaft extending outwardly from the casing. The casing also includes at least one hydraulically operated selectively engageable friction clutch assembly for operatively coupling the casing and to a first or second output shaft. A hydraulic clutch actuator selectively frictionally loads the friction clutch assembly. The actuator comprises a hydraulic pump located within the casing to generate a hydraulic pressure to frictionally load the friction clutch assembly. A variable pressure relief valve assembly fluidly communicates with the hydraulic pump to selectively control the hydraulic pressure. The variable pressure relief valve assembly includes a valve closure member, a valve seat complementary to the valve closure member, and an electro-magnetic actuator for engaging the valve closure member. The electro-magnetic actuator urges the valve closure member against the valve seat to selectively vary the release pressure of the pressure relief valve assembly based on the magnitude of an electric current supplied to the electro-magnetic actuator. The electro-magnetic actuator is mounted to the coupling housing.

The current invention also comprises a hydraulic torque coupling assembly with a hollow casing rotatably supported within a coupling housing. The hollow casing has at least one output shaft extending outwardly from the casing. The casing also includes at least one hydraulically operated selectively engageable friction clutch assembly for operatively coupling the casing and to a first or second output shaft. A hydraulic clutch actuator selectively frictionally loads the friction clutch assembly. The actuator comprises a hydraulic pump located within the casing to generate a hydraulic pressure to frictionally load the friction clutch assembly. A variable pressure relief valve assembly fluidly communicates with the hydraulic pump to selectively control the hydraulic pressure. The variable pressure relief valve assembly includes an annular actuator plate that has at least one alignment member and at least one valve closure member. The variable pressure relief valve assembly also includes a valve seat complementary to the valve closure member, and an electro-magnetic actuator for engaging the actuator plate. The electro-magnetic actuator plate urges the valve closure member thereof against the valve seat to selectively vary the release pressure of the pressure relief valve assembly based on a magnitude of an electric current supplied to the electro-magnetic actuator.

The current invention further comprises a variable pressure relief valve system for a differential assembly. The system includes a differential case mounted within the coupling housing. An auxiliary housing formed as a portion of the coupling housing is rotatably mounted to the differential case. An annular actuator plate is disposed within the housing, the actuator plate has a first planar side and a second non-planar side. The actuator plate also includes a valve closure member and two alignment members extending from the second side of the actuator plate. An annular solenoid assembly is positioned adjacent to the actuator plate within the auxiliary housing. The solenoid assembly comprises an annular coil winding and an annular armature disposed coaxial to the coil winding. The armature applies a force to the planar side of the actuator plate so that the valve closure member is urged into a complementary valve seat in the differential case when an electrical current is applied to the annular coil. The force applied to the planar side of the actuator plate is proportional to the electrical current so that the release pressure of the pressure release valve system is variable based on the electrical current applied to the annular coil.

DETAILED DESCRIPTION OF PREFERRED EMBODIMENTS

Figure 1:
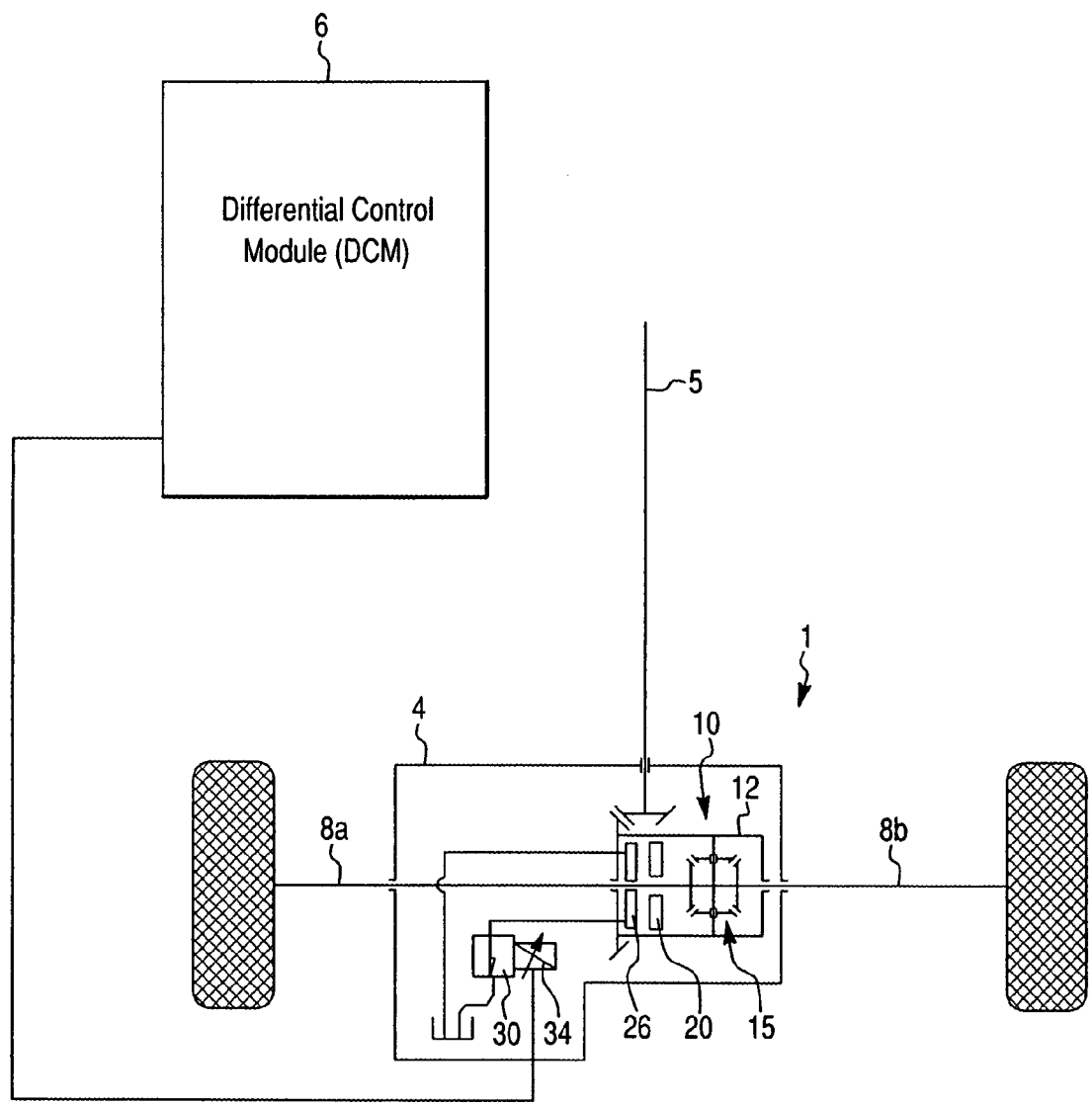
FIG. 1 is a schematic diagram of a rear axle assembly of a motor vehicle including an electronically controlled limited slip differential assembly.

FIG. 1 schematically depicts a rear wheel drive axle assembly 1 including a limited slip differential assembly 10. The differential assembly 10 comprises a differential case 12 rotatably supported within an axle housing 4. An engine (not shown) transmits torque through a drive shaft 5 to a differential gear mechanism 15 within the differential case 12.

As further shown in FIG. 1, the differential assembly 10 includes a multi-disk friction clutch pack 20 and a speed sensitive hydraulic displacement pump 26. The speed sensitive hydraulic displacement pump 26 provides pressurized hydraulic fluid for actuating the clutch pack 20. In the preferred embodiment, the hydraulic displacement pump 26 is a gerotor pump. However, any type of hydraulic pump capable of generating hydraulic pressure in response to the relative rotation between the differential case 12 and one of the output axle shafts 8a, 8b is within the scope of the present invention.

The schematic in FIG. 1 also includes a variable pressure relief valve assembly 30 that selectively controls the pressure applied to actuate the clutch pack 20. The variable pressure relief valve assembly 30 includes an electromagnetic actuator 34. In the preferred embodiment the electromagnetic actuator 34 is a solenoid assembly. The solenoid assembly 34 may optionally be controlled by a Differential Control Module 6. Although a solenoid assembly is preferred, any type of actuation device capable performing the described functions should be considered within the scope of the invention.

Figure 2:
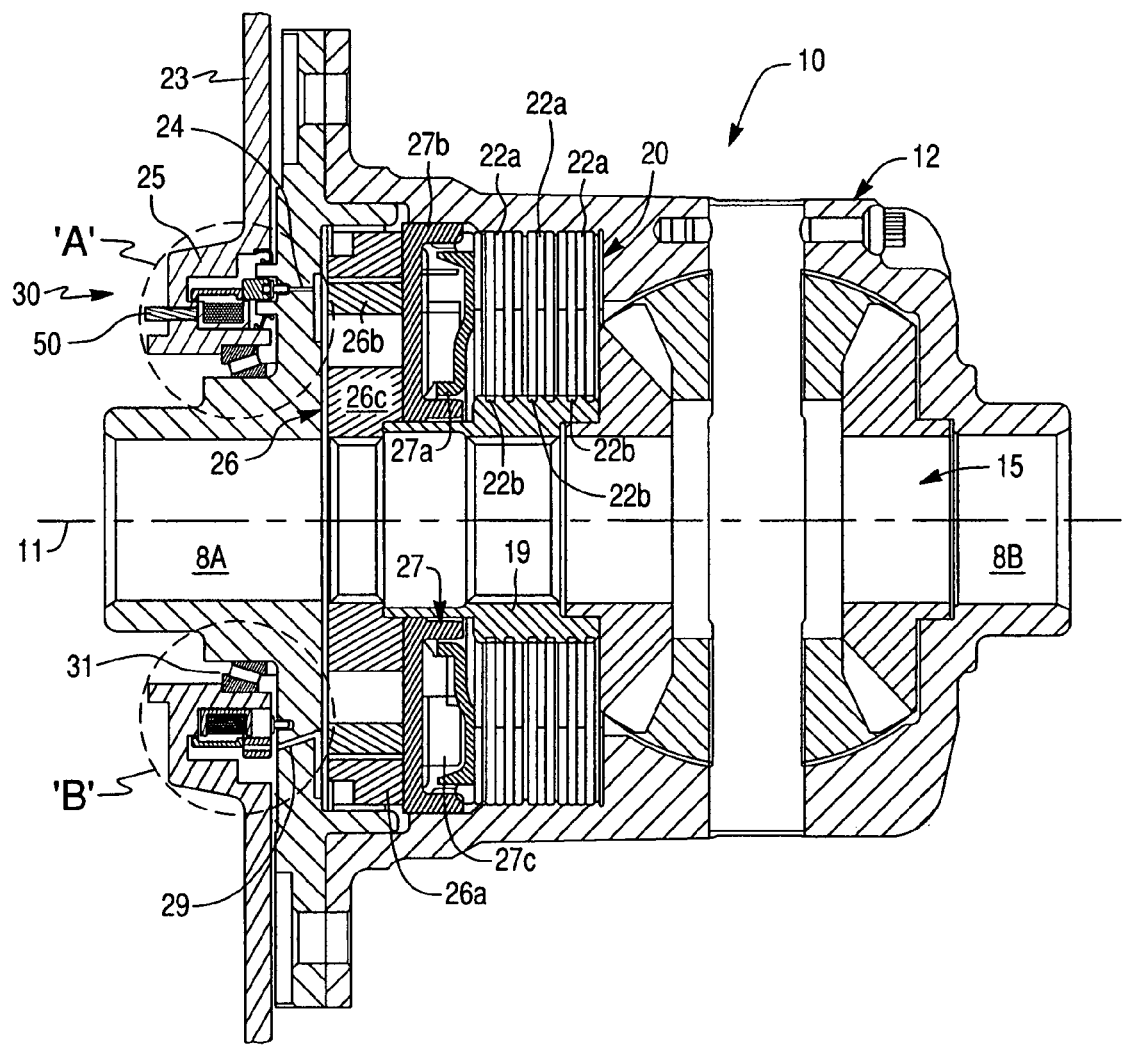
FIG. 2 is a sectional view of the electronically controlled limited slip differential assembly in accordance with the present invention.

FIG. 2 illustrates the preferred embodiment of the current invention in more detail. As shown in FIG. 2, the friction clutch pack 20 includes sets of alternating outer friction plates 22a and inner friction plates 22b. The outer friction plates 22a have projections that engage corresponding grooves formed in the differential case 12. Similarly, the inner friction plates 22b have projections that engage corresponding grooves formed in the clutch sleeve 19. The clutch sleeve 19 is splined to the associated axle shaft 8a. Both the outer friction plates 22a and the inner friction plates 22b are slideable in the axial direction. When the limited slip differential assembly 10 is actuated by the hydraulic clutch actuator system, the outer clutch plates 22a frictionally engage the inner clutch plates 22b to form a torque coupling between the differential case 12 and the output shaft 8a.

The hydraulic clutch actuator system includes the gerotor pump 26, and a piston assembly 27. As described above, the gerotor pump 26 generates hydraulic pressure that is substantially proportional to a rotational speed difference between the differential case 12 and one of the axle output shafts 8a, 8b. The gerotor pump 26 design is well known in the art and includes an outer ring member 26a, an outer rotor 26b, and an inner rotor 26c.

The piston assembly 27 comprises a hydraulically actuated piston 27a that is positioned within a piston housing 27b. A pressure chamber 27c is created between the piston 27a and the piston housing 27b. Hydraulic fluid from the gerotor pump 26 is directed to the piston pressure chamber 27c. When the pressure relief valve assembly 30 is closed, the pressurized hydraulic fluid supplied by the gerotor pump 26 causes the pressure within the piston pressure chamber 27c to increase until the pressure chamber 27c begins to expand. As the piston pressure chamber 27c expands, the expansion forces the piston 27a to move axially, thereby engaging the clutch pack 20 and actuating the differential assembly 10. Actuation of the differential assembly 10 allows for a torque transfer distribution between the axle shafts 8a and 8b.

Figure 3:
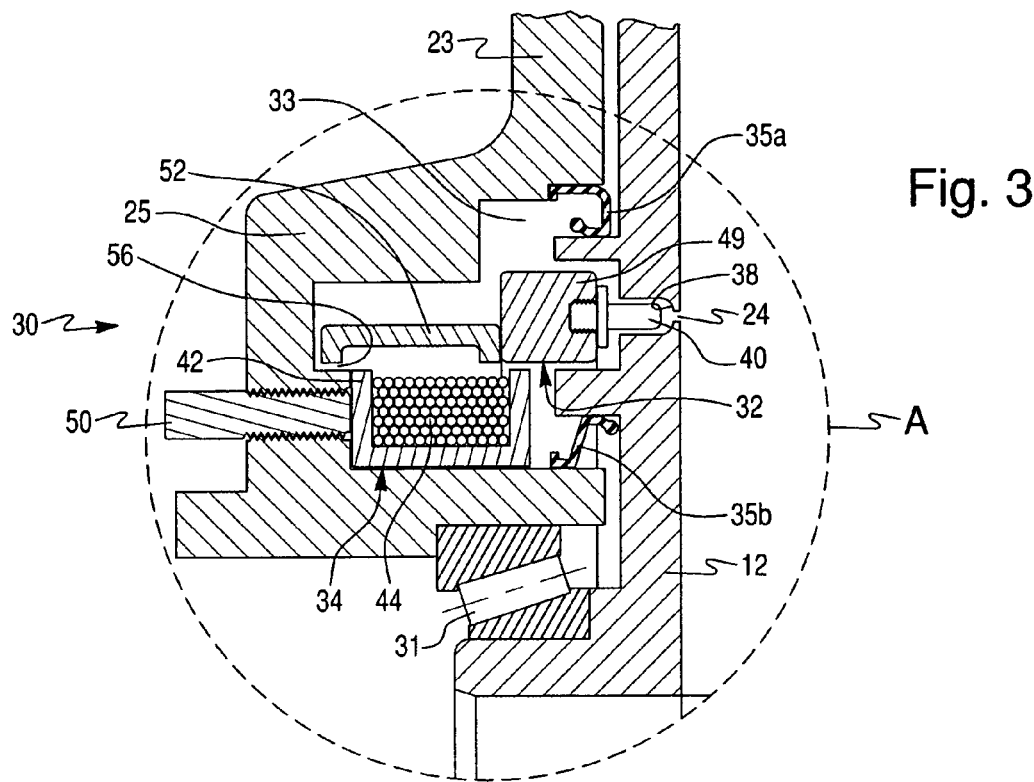
FIG. 3 is an enlarged partial sectional view of a variable pressure relief valve assembly shown in a circle 'A' in FIG. 2.
Figure 4:
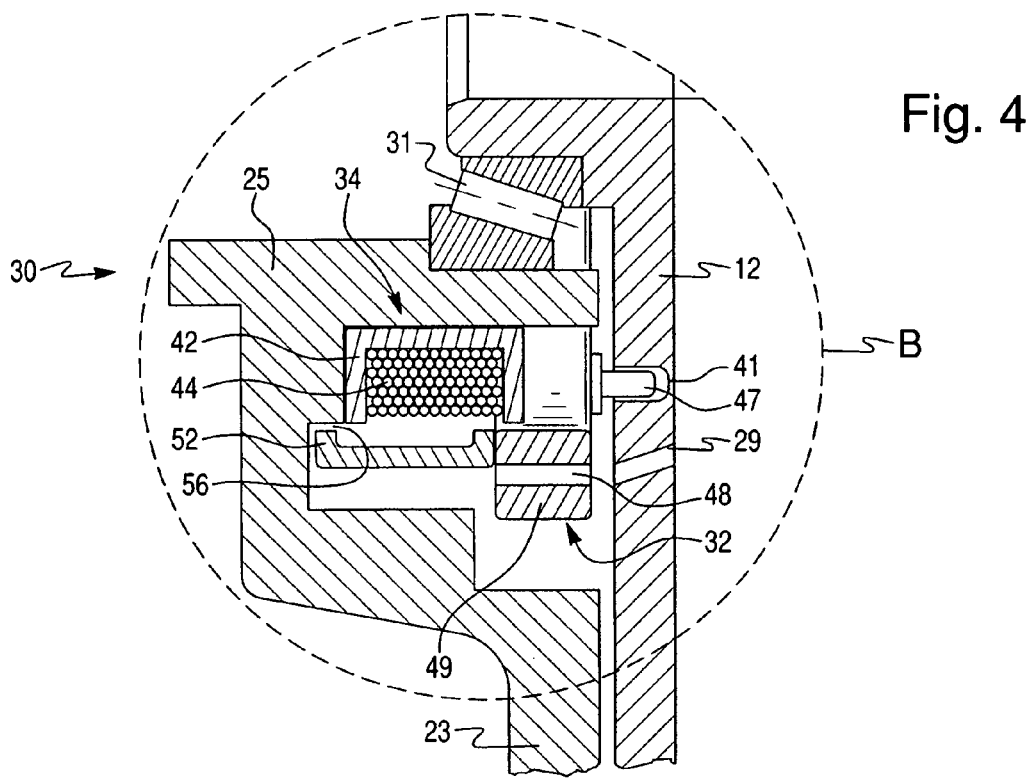
FIG. 4 is an enlarged partial sectional view of a variable pressure relief valve assembly shown in a circle 'B' in FIG. 2.

As best shown in FIG. 2, the pressure relief valve assembly 30 is housed in an auxiliary solenoid housing 25 that is connected to a housing flange 23. The housing flange 23 is formed as a part of the axle housing 4 (shown in FIG. 1). The auxiliary solenoid housing 25 also rotatably supports the differential case 12 through a roller bearing assembly 31. In other words, the variable pressure relief valve assembly 30 is mounted to the axle housing 4 to be independently supported thereby and to be rotatable relative to the differential case 12 through the roller bearing assembly 31. As shown in FIGS. 3 and 4, the pressure relief valve assembly 30 primarily comprises a pressure relief valve actuator plate 32 and a solenoid assembly 34 that are partially enclosed in the auxiliary housing 25. In the preferred embodiment, the auxiliary housing 25 encloses the solenoid assembly 34 on three sides, however, variation of the form of the housing should be considered within the scope of the invention. A sump cavity 33 within the auxiliary solenoid housing 25 is sealed by lip seals 35a and 35b.

FIG. 3 shows a partial cross-section ('A') of the valve portion of the pressure relief valve assembly 30. A valve closure member 40 of the actuator plate 32 is positioned opposite a substantially conical valve seat 38. For illustration purposes, only the valve closure portion 40 and a cross-section of a body 49 of the actuator plate 32 are shown in FIG. 3. The valve seat 38 is positioned on the face of the differential case 12 at the point where a piston pressure chamber passage 24 exits the differential case 12. In the preferred embodiment, the valve seat 38 has a cone shape; however the valve seat 38 may have any shape that corresponds to the shape of the valve closure member 40. The valve seat 38 is in fluid communication with the piston pressure chamber 27c through the piston pressure chamber passage 24. The valve closure member 40 is movable between a closed position in which the valve closure member 40 engages the valve seat 38, and an open position in which the valve closure member 40 is axially spaced away from the valve seat 38. FIG. 3 shows the pressure relief valve assembly 30 in the partially closed position so that the valve closure portion 40 partially blocks the piston pressure chamber passage 24.

FIG. 4 shows a partial cross-section ('B') of a portion of the pressure relief valve assembly 30 that is opposite the cross-section 'A'. For illustration purposes, only a fragmentary cross-section of the actuator plate 32 is shown. The actuator plate 32 also includes alignment pins 47 that engage corresponding guide seats 41 in the face of the differential case 12. As the actuator plate 32 rotates with the differential case, the alignment pins 47 ensure that the valve closure portion 40 of the actuator plate 32 remains aligned with the valve seat 38. Passages 48 in the actuator plate 32 are disposed adjacent a hydraulic fluid inlet passage 29 in the face of the differential case 12. Hydraulic fluid is drawn into the differential 12 by the gerotor pump 26 through the inlet passage 29.

As shown in FIGS. 3 and 4, the pressure relief valve assembly 30 also comprises an annular solenoid assembly 34. The solenoid assembly 34 includes a substantially annular coil housing 42, a coil winding 44, and an axially moveable annular armature 52. Although an armature-type solenoid assembly is preferred, and type of solenoid or actuator mechanism able to selectively apply a force to the valve closure member should be considered within the scope of the art. The armature 52 is coaxial to the coil winding 44, and is radially spaced from the coil winding 44 so that an air gap 56 exists between the armature 52 and the coil winding 44. In the preferred embodiment, the armature 52 has a generally U-shaped cross-section with magnetic poles facing the coil winding 44, similar to those used in reluctance electric motors. However, the armature 52 may have any shape known in the art consistent with the armature's 52 function. As shown in FIGS. 2 and 3, an electrical connector 50 is connected to windings 44 and extends outwardly from the solenoid housing 25. The connector 50 may be attached to any source of electrical power appropriate to the operation of the solenoid assembly 34.

Figure 5:
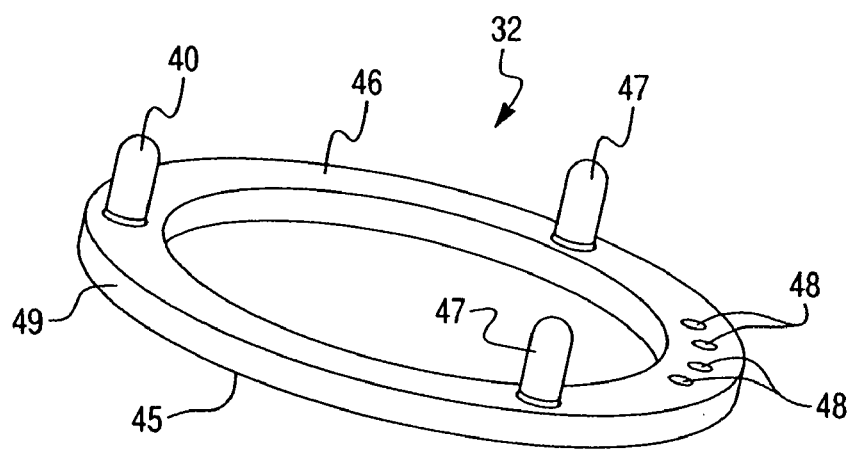
FIG. 5 is an isometric view of the pressure relief valve actuator plate of the current invention.
Figure 6:
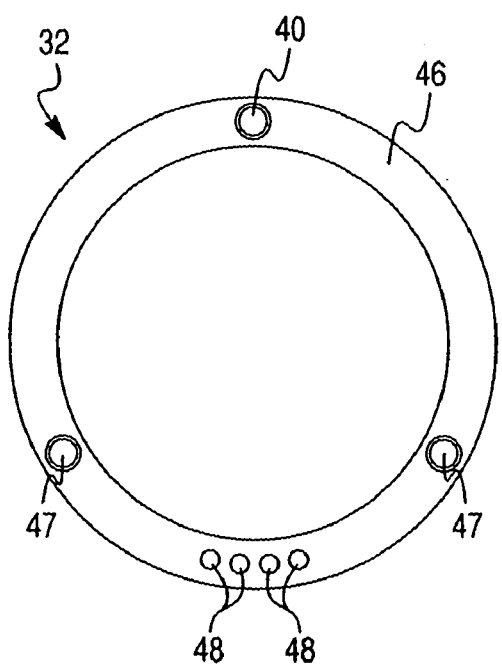
FIG. 6 is a plan view of a non-planar side of the pressure relief valve actuator plate.
Figure 7:
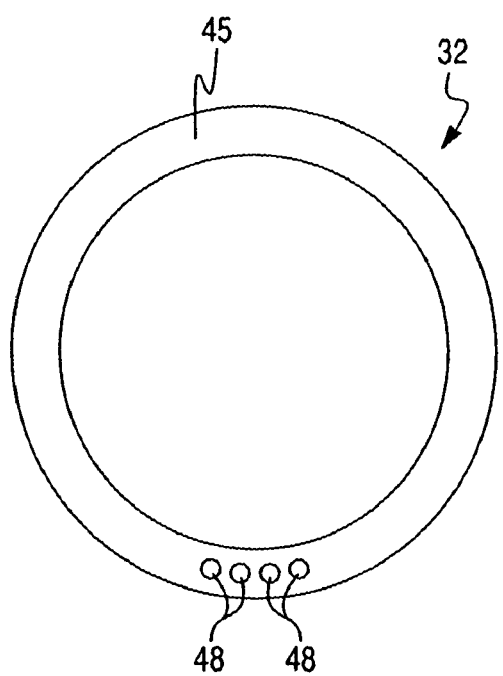
FIG. 7 is a plan view of a planar side of the pressure relief valve actuator plate.

As best shown in FIGS. 5-7, the annular actuator plate 32 has a flat, planar side 45 and a non-planar pin side 46. The pin side 46 of the actuator plate 32 includes the valve closure member 40, and the two alignment pins 47. Although two alignment pins 47 are preferred, as few as one or more than two pins may be used. Similarly, in an alternative embodiment, the planar side 45 may be grooved or otherwise shaped. In the preferred embodiment, the valve closure member 40 and alignment pins 7 have a cylindrical shape and are rounded at one end, however, the valve closure member 40 and alignment pins 47 may have any shape known in the art that is consistent with their function. The flat side 45 of the actuator plate 32 is essentially planar and has no protrusions. A plurality of passages 48 extend through the body 49 of the actuator plate 32 between the two alignment pins 47.

Preferably, the body 49 of the actuator plate 32 is comprised of plastic, however, the body of the actuator plate and associated components may be comprised of any material known in the art. The valve closure member 40 and alignment pins 47 may be formed as a single component with the valve actuator plate body 49, or the valve closure member 40 and alignment pins 47 may be threaded into the body 49, adhesively bonded, or similarly attached in any manner known in the art. The valve closure member 40 may be comprised of the same or a different material from the alignment pins 47. Similarly, the valve closure member may be comprised of the same or a different material than the plate body 49.

As best shown in FIGS. 3 and 4, in operation, when electrical current is applied to the coil winding 44 through the connector 50, a magnetic flux flows through the armature 52. The magnetic flux creates a force that moves the armature 52 axially relative to the coil winding 44 toward a position that is in vertical alignment with the winding 44. As the armature 52 moves axially, the armature 52 contacts the flat side 45 of the valve actuator plate 32 and urges the actuator plate 32 and associated valve closure member 40 toward the valve seat 38 with a predetermined axial force that is a function of the electrical current supplied to the coil winding 44.

When the pressure relief valve assembly 30 is in the fully closed position and the valve closure member 40 is fully engaged with the valve seat 38, hydraulic fluid will not circulate out of the differential case 12. Hydraulic fluid will not flow out of the differential case 12 until the pressure generated by the gerotor pump 26 and accumulated in the piston pressure chamber 27c overcomes the axial force imparted to the armature 52, which presses the valve closure member 40 into the valve seat 38. When the pressure accumulated in the piston pressure chamber 27c produces sufficient force to push the valve closure member 40 out of the valve seat 38, hydraulic fluid will circulate out of the differential case 12. Therefore, the release pressure of the pressure relief valve assembly 30 is a function of the current supplied to the coil winding 44, and provides a predetermined and selectively variable pressure limit for the hydraulic system. Thus, the pressure relief valve assembly 30 selectively sets the release pressure of the valve closure member 40 based on the magnitude of the electrical current supplied to the coil winding 44, and subsequently, defines the magnitude of the pressure that accumulates within the piston pressure chamber 27c.

From the foregoing description it is clear that the electronically controlled differential assembly 10 of the present invention represents a novel arrangement. The pressure relief valve assembly 30 is mounted outside the differential 10 so that the design of the pressure relief valve assembly 30 is simplified. Further, the valve actuator plate of the present invention replaces the conventional ball-type closure mechanism and increases the durability of the pressure relief valve assembly, and the reliability of the differential hydraulic system.

As shown in FIG. 1 and described above, the solenoid assembly 34 of the present invention may be electronically controlled by a differential control module 6 based on one or more vehicle parameters as control inputs, such as a vehicle speed, a wheel speed difference, vehicle yaw rate, a vehicle lateral acceleration, a steering angle, an engine throttle position, a brake application, an ice detection, a moisture detection, a vehicle driveline configuration and a yaw stability control system actuation. A programmable vehicle control mechanism can also be used to interface with the limited slip system.

The description of the preferred embodiments of the present invention has been presented for the purpose of illustration in accordance with the provisions of the Patent Statutes. It is not intended to be exhaustive or to limit the invention to the precise forms disclosed. For example, it is to be understood that while the present invention is described in relation to a speed sensitive limited slip differential, the present invention is equally suitable for use in other hydraulically actuated friction couplings, such as torque coupling mechanisms for a drive-train utilizing a speed sensitive limited slip device. Additionally, although FIG. 1 shows a rear-wheel drive embodiment of the invention, the invention is equally applicable to a front-wheel drive configuration of the differential system.

Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hydraulic torque coupling assembly comprising:
a coupling housing;

a hollow casing rotatably supported within said coupling housing;
at least one output shaft axially outwardly extending from said casing;
at least one hydraulically operated selectively engageable friction clutch assembly for operatively coupling said casing and at least one output shaft;
at least one hydraulic clutch actuator for selectively frictionally loading said at least one friction clutch assembly, said actuator comprising:
a hydraulic pump located within said casing to generate a hydraulic pressure to frictionally load said at least one friction clutch assembly; and
a variable pressure relief valve assembly fluidly communicating with said hydraulic pump to selectively control said hydraulic pressure;
said variable pressure relief valve assembly includes a valve closure member, a valve seat complementary to said valve closure member and an electro-magnetic actuator for engaging said valve closure member and urging thereof against said valve seat so as to selectively vary a release pressure of said pressure relief valve assembly based on a magnitude of an electric current supplied to said electro-magnetic actuator;
wherein said electro-magnetic actuator is mounted to said coupling housing to be independently supported thereby.

2. The hydraulic torque coupling assembly of claim 1, further comprising an auxiliary housing that is formed as a portion of said coupling housing, said auxiliary housing at least partially enclosing said electro-magnetic actuator.

3. The hydraulic torque coupling assembly of claim 2, wherein said auxiliary housing encloses said electro-magnetic actuator on three sides.

4. The hydraulic torque coupling assembly of claim 2, further comprising an electrical connector extending from said auxiliary housing to deliver power to said electro-magnetic actuator.

5. The hydraulic torque coupling assembly of claim 2, wherein said auxiliary housing rotatably supports to said casing.

6. The hydraulic torque coupling assembly of claim 5, wherein a roller bearing is disposed between said auxiliary housing and said casing.

7. The hydraulic torque coupling assembly of claim 6, wherein said roller bearing is disposed between a horizontal surface of said differential case and said auxiliary housing.

8. The hydraulic torque coupling assembly of claim 7, wherein said electro-magnetic actuator is a solenoid assembly.

9. The hydraulic torque coupling assembly of claim 8, wherein said solenoid assembly comprises an annular coil winding and a coaxial armature.

10. The hydraulic torque coupling assembly of claim 9, wherein said armature applies a force to said valve closure member to selectively vary a release pressure of said pressure relief valve assembly based on a magnitude of an electric current supplied to said annular coil winding.

11. A hydraulic torque coupling assembly comprising:
a coupling housing;
a hollow casing rotatably supported within said coupling housing;
at least one output shaft axially outwardly extending from said casing;
at least one hydraulically operated selectively engageable friction clutch assembly for operatively coupling said casing and at least one said shaft;
at least one hydraulic clutch actuator for selectively frictionally loading said at least one friction clutch assembly, said actuator comprising:
a hydraulic pump located within said casing to generate a hydraulic pressure to frictionally load said at least one friction clutch assembly; and
a variable pressure relief valve assembly fluidly communicating with said hydraulic pump to selectively control said hydraulic pressure;
said variable pressure relief valve assembly includes an annular actuator plate having at least one alignment member and at least one valve closure member, at least one valve seat complementary to said at least one valve closure member and an electro-magnetic actuator for engaging said actuator plate and urging said at least one valve closure member thereof against said at least one valve seat so as to selectively vary a release pressure of said pressure relief valve assembly based on a magnitude of an electric current supplied to said electro-magnetic actuator.

12. The hydraulic torque coupling assembly of claim 11, wherein said valve seat is positioned on a first face of said casing, said at least one alignment member engaging a guide seat on said first face of said casing so that said actuating plate rotates with said casing.

13. The hydraulic torque coupling assembly of claim 11, wherein said actuator plate has a planar first side and a non-planar second side, said at least one valve closure member and said at least one alignment member extending from said second side.

14. The hydraulic torque coupling assembly of claim 13, wherein said actuator plate comprises first and second alignment members.

15. The hydraulic torque coupling assembly of claim 14, wherein said first and second alignment members are each spaced an equal distance from said at least one valve closure member around a periphery of said actuator plate.

16. The hydraulic torque coupling assembly of claim 14, wherein said actuator plate further comprises a plurality of passages extending from said planar side to said non planar side.

17. The hydraulic torque coupling assembly of claim 16, wherein said passages are disposed between said first and second alignment members.

18. The hydraulic torque coupling assembly of claim 16, wherein said passages are disposed adjacent an oil intake aperture in said casing.

19. The hydraulic torque coupling assembly of claim 11, wherein said electro-magnetic actuator comprises a solenoid, said solenoid comprising an annular coil winding and an annular armature, said armature selectively applying a force to said actuator plate, the force being proportional to the electric current applied to said solenoid.

20. A variable pressure relief valve system for a differential assembly comprising:
a coupling housing,
a differential case mounted within said coupling housing,
an auxiliary housing formed as a portion of said coupling housing and rotatably mounted to said differential case,
an annular actuator plate disposed within said auxiliary housing, said actuator plate having a first planar side, and a second non-planar side, said actuator plate having a valve closure member and two alignment members extending from said second side of said actuator plate; and an annular solenoid assembly disposed adjacent to said actuator plate within said auxiliary housing, said solenoid assembly comprising:
  an annular coil winding; and
  an annular armature disposed coaxial to said coil winding;
wherein said armature applies a force to said planar side of said actuator plate so that said valve closure member is urged into a complementary valve seat in said differential case when an electrical current is applied to said annular coil, the force being proportional to the electrical current so that a release pressure of said pressure release valve system is variable based on the electrical current applied to said annular coil.

* * * * *